United States Patent [19]
Alexander

[11] 3,884,433
[45] May 20, 1975

[54] WING MOUNTED THRUST REVERSER

[75] Inventor: John D. Alexander, Bellevue, Wash.

[73] Assignee: The Boeing Company, Seattle, Wash.

[22] Filed: Oct. 11, 1973

[21] Appl. No.: 405,385

[52] U.S. Cl. ....... 244/42 CC; 244/12 D; 244/110 B
[51] Int. Cl. ............................................. B64c 21/04
[58] Field of Search ...... 244/42 CB, 42 CC, 42 CD, 244/42 D, 42 DA, 42 DB, 42 DC, 113, 12 D, 12 A, 12 B, 23 D, 110 B, 12 R, 23 R, 23 A, 23 B

[56] References Cited
UNITED STATES PATENTS

| | | | |
|---|---|---|---|
| 2,991,961 | 7/1961 | Rogallo et al. | 244/12 R |
| 3,259,340 | 7/1966 | Whittley et al. | 244/42 CC |
| 3,347,495 | 10/1967 | Eberhardt et al. | 244/42 CC |
| 3,353,355 | 11/1967 | Jordan | 244/110 B |
| 3,442,470 | 5/1969 | Farbridge et al. | 244/42 CC |
| 3,478,988 | 11/1969 | Roed | 244/12 D |
| 3,677,504 | 7/1972 | Schwarzler et al. | 244/42 CC |

Primary Examiner—Trygve M. Blix
Assistant Examiner—Galen L. Barefoot
Attorney, Agent, or Firm—Morris A. Case; Glenn Orlob

[57] ABSTRACT

A Coanda surface located to direct an augmenting gas flow along the span of extended flaps is pivotally linked to the wing structure to allow two pivot points for rotation of a member which has the Coanda surface. When pivoted the curved back side of the member is placed directly into the stream of augmenting gas to redirect the flow forward.

8 Claims, 3 Drawing Figures

3,884,433

WING MOUNTED THRUST REVERSER

BACKGROUND OF THE INVENTION

Thrust reversers on the engines to direct the hot exhaust gases forward, once the airplane touches down, have long been used to assist in deceleration upon landing an aircraft. These thrust reversers work well, but do create engine ingestion problems.

It is known to obtain engine thrust reversal by directing hot exhaust gases upwardly through spanwise plenum chambers through the wing which directs the hot gases obliquely forwardly-upwardly over a fixed wing aircraft.

It is also known to locate flaps in relation to the exhaust gases from an airplane to receive the flow of the gases through extended slotted flaps to give lift then thrust reverser effect when the slots are extended further to direct the flow of gases upward.

It was discovered that wing mounted thrust reversing may be obtained on a system having a thrust augmentation wing system.

SUMMARY OF THE INVENTION

Wing thrust augmentation is obtained with by-pass gases from the airplane engines being ducted to a plenum extending spanwise between the rear spar and the flaps and ailerons. Nozzles from the plenum direct the gases rearward which gives an augmenting thrust to the airplane. The rearwardly directed gases may pass over the top of the flap and aileron surfaces. However, when a thrust augmentation type of flap is used the flap is segmented into an upper and lower part and the gases are directed between the two segments. When practicing this invention, and when the flaps are extended, a Coanda surface adjacent the nozzles extends toward the flaps which turns the gas stream to make for smooth flow over the flap surfaces. The member making up the Coanda surface is pivotally mounted to the wing structure with a pair of links or bars set at an acute angle to each other. The Coanda containing member may be simultaneously raised and rotated on the double-bar linkage to place the back side of the Coanda containing member in the path of the rearwardly directed gases to redirect those gases forward to spoil the wing lift and reverse the thrust.

DETAILED DESCRIPTION

Figure 1:
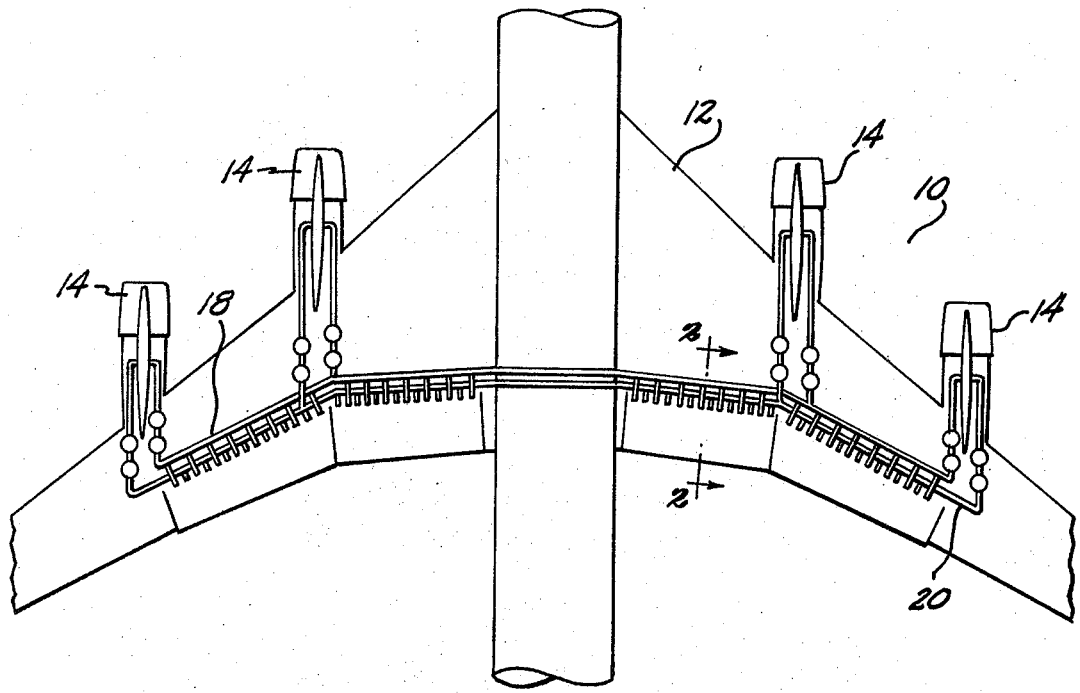
FIG. 1 is a fragmented plan view of an airplane showing ducting for augmentor blowing.

Airplane 10 has wing 12, engines 14 and flaps 16. The airplane has a thrust augmentation system for supplying by-pass or bleed gases from the engines to the flap areas. Gas from each engine is divided into two parts so that each engine is connected through ducting into plenum chambers 18 and 20 each of which extends along the span of the flaps rearward of wing rear spar 22.

Figure 2:
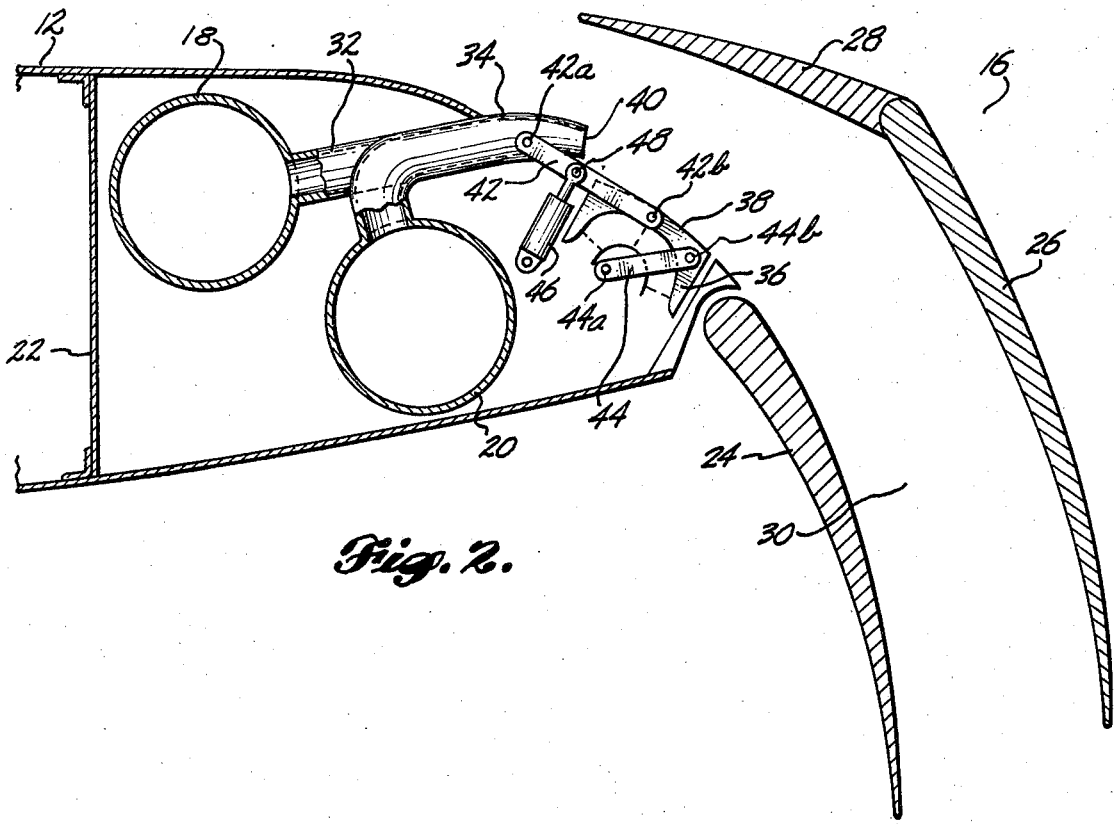
FIG. 2 is a section taken along line 2—2 of FIG. 1 showing flaps in extended position with a member which has a Coanda surface in lowered position.
Figure 3:
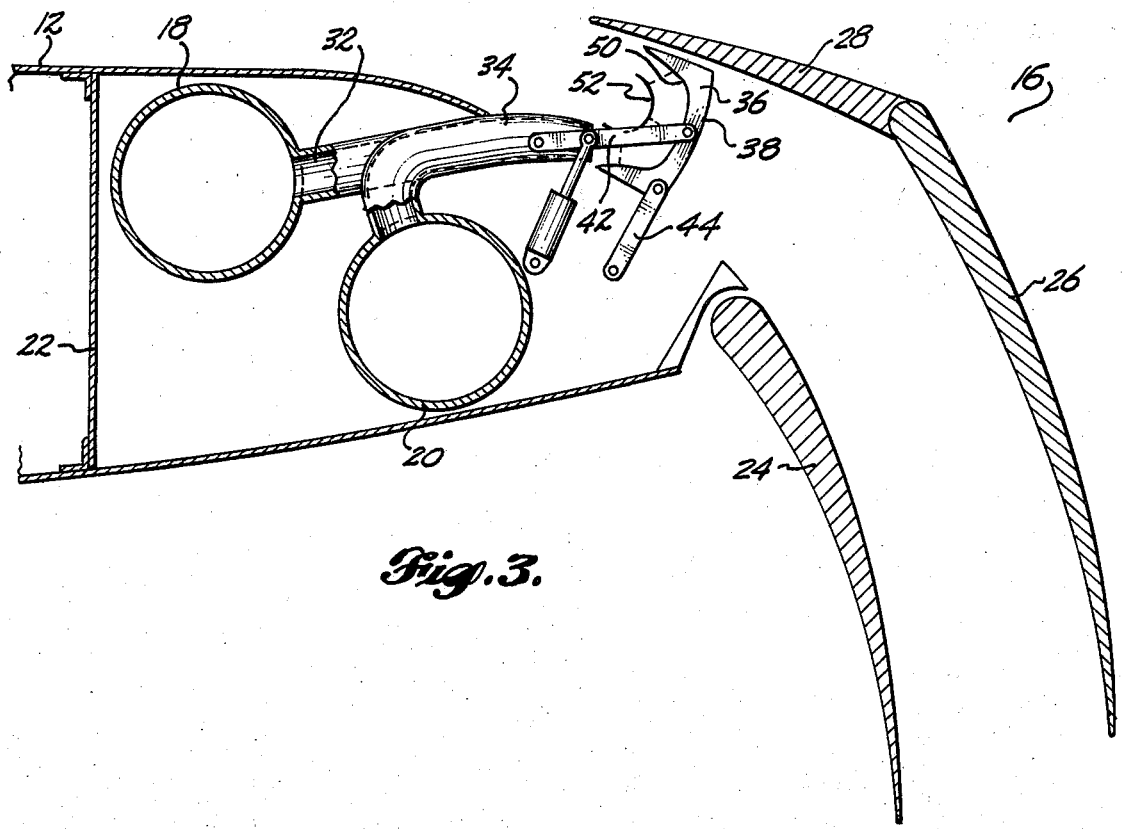
FIG. 3 is the same view as in FIG. 2 with the member in the erected position to act as a thrust reverser.

In FIG. 2, flap 16 is shown in the extended position for furnishing maximum lift to the wings during take off or landing. The flap shown in this embodiment is of the thrust augmentation type which is segmented into lower part 24 and upper part 26 having shroud 28 connected thereto. The segmented flaps create a channel 30 therebetween. The flaps may be as shown or may be slotted. Pressurized gas in plenums 18 and 20 is rearwardly directed into the channel created by the segmented flaps through nozzles 32 and 34 respectively. A member 36 has Coanda surface 38 adjacent the opening 40 of the nozzles and extends along the sides of the channel toward the lower flap segment when the airplane is airborne. This Coanda surface turns the stream of gas issuing from the nozzles to obtain smooth flow into the channel. Link 42 with pivot points 42a and 42b and link 44 with pivot points 44a and 44b extend at an acute angle to each other and each is pivotally connected between the member having the Coanda surface and the wing. Link 42 is mounted to the wing at pivot point 42a, and extends alongside the Coanda surface with pivot point 42b fastened at about the mid-point of the member. Link 44 is mounted with pivot point 44b fastened near an end of the member. A cylinder 46 is pivotally mounted at 48 to one of the linkages. When a landing airplane touches down the cylinder is actuated which acts on the linkage to raise and rotate the member which has the Coanda surface which places the curved back side 50 of the member directly into the stream of gas issuing from the nozzles to redirect said stream forwardly to spoil the wing lift, create a reversing thrust and provide additional load on the landing gear members to assist in slowing the airplane. A turning vane 52 may be used to smooth the reversing flow.

In operation the flaps 16 are extended during a landing approach and a high percentage of the engine gases are directed into the wing thrust augmentation system to provide high wing lift at the slow airspeeds. The member 36 is in the lowered position as shown in FIG. 2 to provide an efficient flow of directed gases. Dual plenum chambers 18 and 20 for supplying pressurized gas assure symmetrical thrust conditions even though one or more of the engines were to suddenly fail. The nozzles from the plenum chambers may be alternate as shown or each plenum may have a spanwise rearwardly directed nozzle.

Upon landing the cylinder 46 is actuated to raise and rotate the member to place the back side 50 into the path of the rearwardly directed gas stream to reverse its direction and impart a reversing thrust. The dual gas system assures a symmetrical reversing thrust.

I claim:

1. A wing mounted thrust reverser for an airplane having a thrust augmentation system comprising:
   a. a flap having upper and lower segments which in extended position for take-off or landing provide a channel therebetween,
   b. means for rearwardly directing into the channel a spanwise volume of gas under pressure from plenum chambers through wing mounted nozzles,
   c. means for turning the rearwardly directed gas for smooth flow within the channel between the flap segments, and
   d. means for moving the turning means into the channel to redirect the gas flow forward to spoil the wing lift characteristics and provide a reversing thrust.

2. A wing mounted thrust reverser for an airplane comprising:

a. a rearwardly directed stream of high pressure gas from plenum chambers extending spanwise along the wing rear span thence through a plurality of nozzles distributed along flap areas, b. a series of segmented flaps of the high lift thrust augmentation type, c. a member which has a Coanda surface along each flap adjacent the nozzle outlets to turn the gas stream for smooth flow between the segments of the flaps, d. a linkage system between the member and the wing, and e. means for imparting motion to the linkage to move the back surface of the member between the segments and into the stream of gas to direct said stream forward to impart a reversing thrust to the airplane.

3. A wing mounted thrust reverser for an airplane as in claim 2 wherein the member has a turning vane connected to the back surface.

4. A combination of an airplane with wings, bypass turbofan engines, and a wing mounted thrust reverser comprising: segmented thrust augmentation flaps, a ducting system extending from the engines to rearwardly direct a stream of gas spanwise between the segments of the flaps, a member having a Coanda surface located between the gas outlet and the flaps to turn the stream of gas smoothly between the flap segments, a double bar linkage each of which is pivotally mounted between the member and the wing wherein the links effect an acute angle to each other, and means for imparting motion to the linkage to raise and rotate the member into the stream of gas with a curved back side to the Coanda surface facing toward and redirecting the stream of gas forward.

5. A wing mounted thrust reverser for an airplane having a thrust augmentation system comprising: a pair of plenum chambers located on each wing and extending spanwise between wing rear span and wing flaps; a thrust augmentation flap segmented into an upper and a lower part extending spanwise along the wing to form a channel therebetween; nozzles extending from each plenum chamber direct a stream of gas rearward into the channel; a member which has a Coanda surface extends adjacent the nozzles and toward the flaps to turn the gas stream for smooth flow into the channel, said member has a curved back side; a double bar linkage extends from the wing to the member; and means for actuating the linkage to raise and rotate the member to place the curved back side of the member in the channel directly into the stream of gas to reverse the thrust.

6. A wing mounted thrust reverser as in claim 5 further comprising: a turning vane connected to the back side of the member.

7. A method of effecting a wing mounted thrust reverser with an airplane having thrust flaps and augmentation system with the steps comprising: utilizing segmented above and below augmentation flaps, directing a stream of gas through plenum chambers and nozzles on each wing into space between the segmented flap, positioning a member with a Coanda surface immediately ahead of the flaps to turn the flow of gas efficiently into the flaps, holding the member in position with a pair of pivotable links extending between the member and the wing structure, and rotating the links to move the back side of the member between the segments and directly into the stream of gas to redirect said gas forward to effect thrust reversal.

8. A method of effecting a wing mounted thrust reverser as in claim 7 with the further step of utilizing a turning vane on the back side of the member to increase the efficiency of the reversing thrush.

* * * * *